United States Patent [19]

Debany, Jr. et al.

[11] Patent Number: 4,580,274
[45] Date of Patent: Apr. 1, 1986

[54] TRANSCEIVER TEST DEVICE

[75] Inventors: Warren H. Debany, Jr.; Mark S. Zemgulis; Norman J. Sturdevant, Jr., all of Rome, N.Y.

[73] Assignee: The United States of America as represented by the Secretary of the Air Force, Washington, D.C.

[21] Appl. No.: 657,092

[22] Filed: Oct. 2, 1984

[51] Int. Cl.⁴ ............................................. H04B 17/00
[52] U.S. Cl. ........................................ 375/10; 371/22; 371/25; 455/67
[58] Field of Search ............... 375/8, 9, 10; 371/15, 371/22, 25; 370/13, 15; 179/175, 175.2 R, 175.31 R; 455/31, 38, 67; 340/146.2, 825.16, 825.17, 825.3, 825.52

[56] References Cited

U.S. PATENT DOCUMENTS

| | | | |
|---|---|---|---|
| 3,573,751 | 4/1971 | Delisle | 364/900 |
| 3,909,720 | 9/1975 | Fantera | 455/52 |
| 3,976,864 | 8/1976 | Gordon et al. | 235/153 AC |
| 4,048,564 | 9/1977 | Gleeson, Jr. | 324/77 R |
| 4,161,635 | 7/1979 | Wolaver | 370/15 |
| 4,192,451 | 3/1980 | Swerling et al. | 371/20 |
| 4,255,792 | 3/1981 | Das | 364/580 |
| 4,267,594 | 5/1981 | Brunson | 371/20 |
| 4,404,630 | 9/1983 | Belforte et al. | 371/22 |

Primary Examiner—Benedict V. Safourek
Attorney, Agent, or Firm—Donald J. Singer; Richard J. Donahue

[57] ABSTRACT

A device for testing the digital waveforms in a special purpose multi-channel transceiver system designed to operate in a tactical environment. As selected waveforms are presented to the test device, they are randomized over a fixed time period creating a unique signature for comparison with a prestored signature at the end of the period. Uniquely assigned light emitting diodes identify which, if any, of the sequentially examined waveforms are incorrect. Provisions are included for latching the light emitting diodes in their illuminated state in order to detect non-recurrent fault conditions.

8 Claims, 14 Drawing Figures

TRANSCEIVER TEST DEVICE

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to test apparatus and more particularly to a test device for monitoring the performance of a transceiver and for isolating faults therein.

A need exists for test apparatus that can selectively examine the timing waveforms in a special purpose, multi-channel voice transceiver system designed to operate over a fiber optic cable in a tactical environment. Although various test devices exist for testing digital systems, they have been found to be unsuitable for use in the aforementioned application. They are either prohibitively expensive, require the use of sophisticated software or elaborate memory storage devices, cannot detect transient system failures, require human intervention during the testing sequence, do not provide continuous on-line performance monitoring, are not self-testing, or cannot operate in the severe environment imposed on tactical military equipment.

SUMMARY OF THE INVENTION

In accordance with the present invention, a test device is provided which overcomes the aforementioned deficiencies of prior art test devices. As selected waveforms are presented from a transceiver to the test device, they are randomized over a fixed time period creating a unique signature for comparison with a pre-stored signature at the end of the period. Uniquely assigned light emitting diodes identify which, if any, of the sequentially examined waveforms are incorrect. Provisions are included for latching the light emitting diodes in their illuminated state in order to detect non-recurrent fault conditions.

Accordingly it is an object of the present invention to provide a relatively simple test device for confirming proper performance of a transceiver while said transceiver is in operation.

It is a further object of the present invention to provide an on-line transceiver system test device adapted to isolate system failures.

It is yet another object of the present invention to provide a tester unit capable of detecting and isolating a single transient error condition in the digital timing waveforms of an optical transceiver.

These and other objects and advantages of the invention will become more apparent upon reference to the following specifications, attendant claims and drawings.

DETAILED DESCRIPTION OF THE INVENTION

Figure 1:
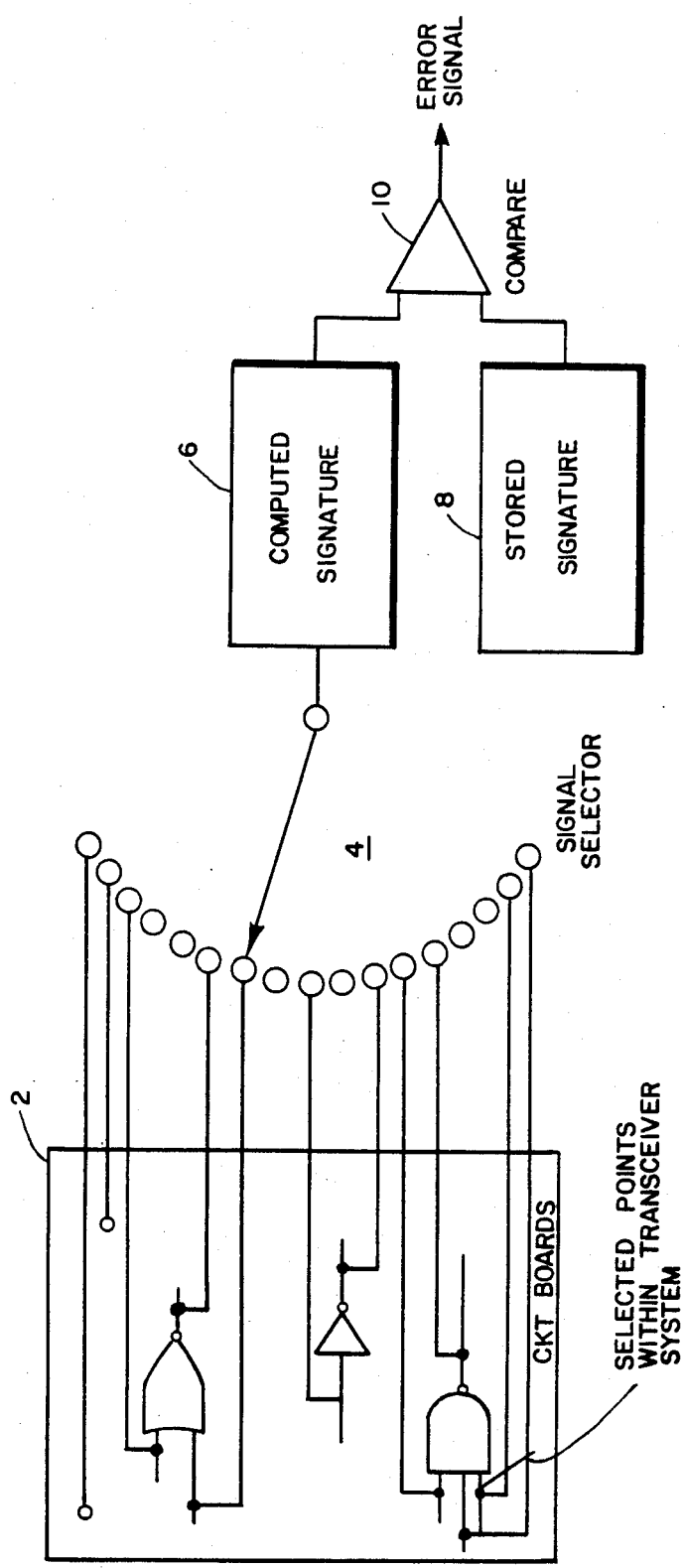
FIG. 1 is a diagram illustrating the basic signature concept employed, in the present invention.

Referring now to the drawings, FIG. 1 illustrates the basic signature comparison concept employed in the tester. Selected points in a transceiver unit, shown within block 2 are hard wired to a selector switch 4 that determines which waveform is examined. As each waveform is presented to the tester it is randomized over a fixed period of time creating a unique signature in functional block 6. This signature is compared to a stored signature in functional block 8 by a comparator 10. If the two signatures are not identical, an error display occurs identifying the failed waveform.

Figure 2:
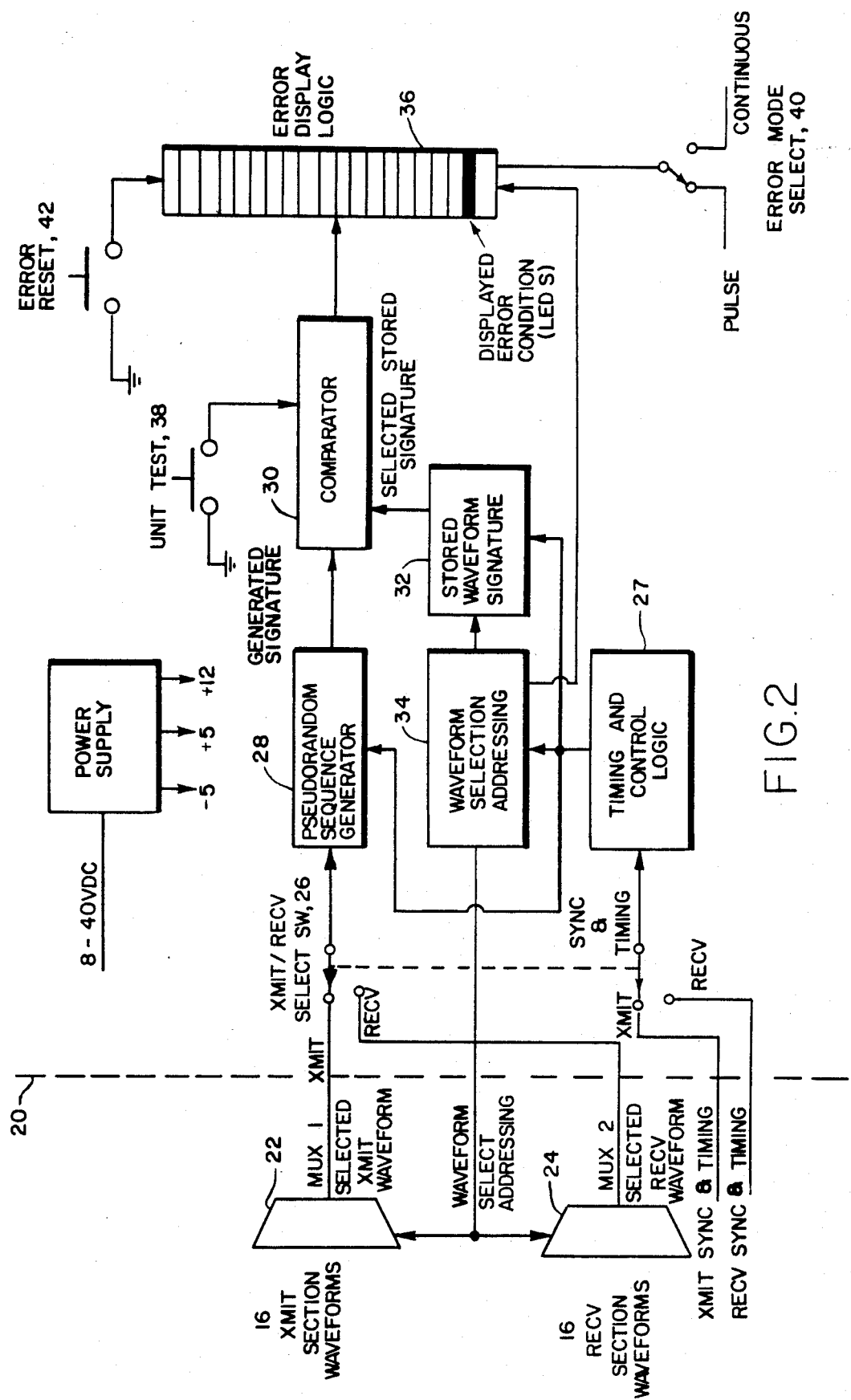
FIG. 2 is a functional block diagram of the present invention.

The functional block diagram of the preferred embodiment of the present invention shown in FIG. 2 carries this concept a step further. The area to the left of the long vertical dashed line 20 represents logic physically located in the transceiver, itself. Sixteen waveforms from the transmit section and sixteen waveforms from the receive section are presented to separate electronic select gates 22 and 24. Depending upon which of the four address lines to the gates are enabled, one of the sixteen waveforms from the transmit section and one of the sixteen waveforms from the receive section will be selected and passed on to the tester unit. At the tester unit either the transmit waveform or the receive waveform will be selected for comparison depending upon the position of the XMIT/RECV Select switch 26. At the same time, another section of switch 26 selects the correct synchronization and timing signals for application to the timing and control logic block 27. As each signal is presented to the tester it is passed through a pseudorandom sequence generator 28 which results in a unique signature at the end of the sampling period. At the end of this period the generated signature is compared in comparator 30 to a correct signature which is stored in an erasable programmable read only memory (EPROM) chip contained in functional block 32.

It will be observed in FIG. 2 that the addressing logic from waveform selection addressing block 34 used for selection of which waveform to examine also selects which stored signature to use for comparison. In the event that the generated signature does not match the pre-stored signature, a light emitting diode (LED) in panel 36, which is also selected by the common addressing logic, is illuminated, uniquely identifying the failure of a given waveform. A table may be provided that lists the particular signal examined and the association of each light to the signal source. Other front panel controls illustrated in FIG. 2, such as Unit Test switch 38, the error display mode switch (Pulse/Continuous) 40 and error reset switch 42, will be discussed below.

Figure 3:
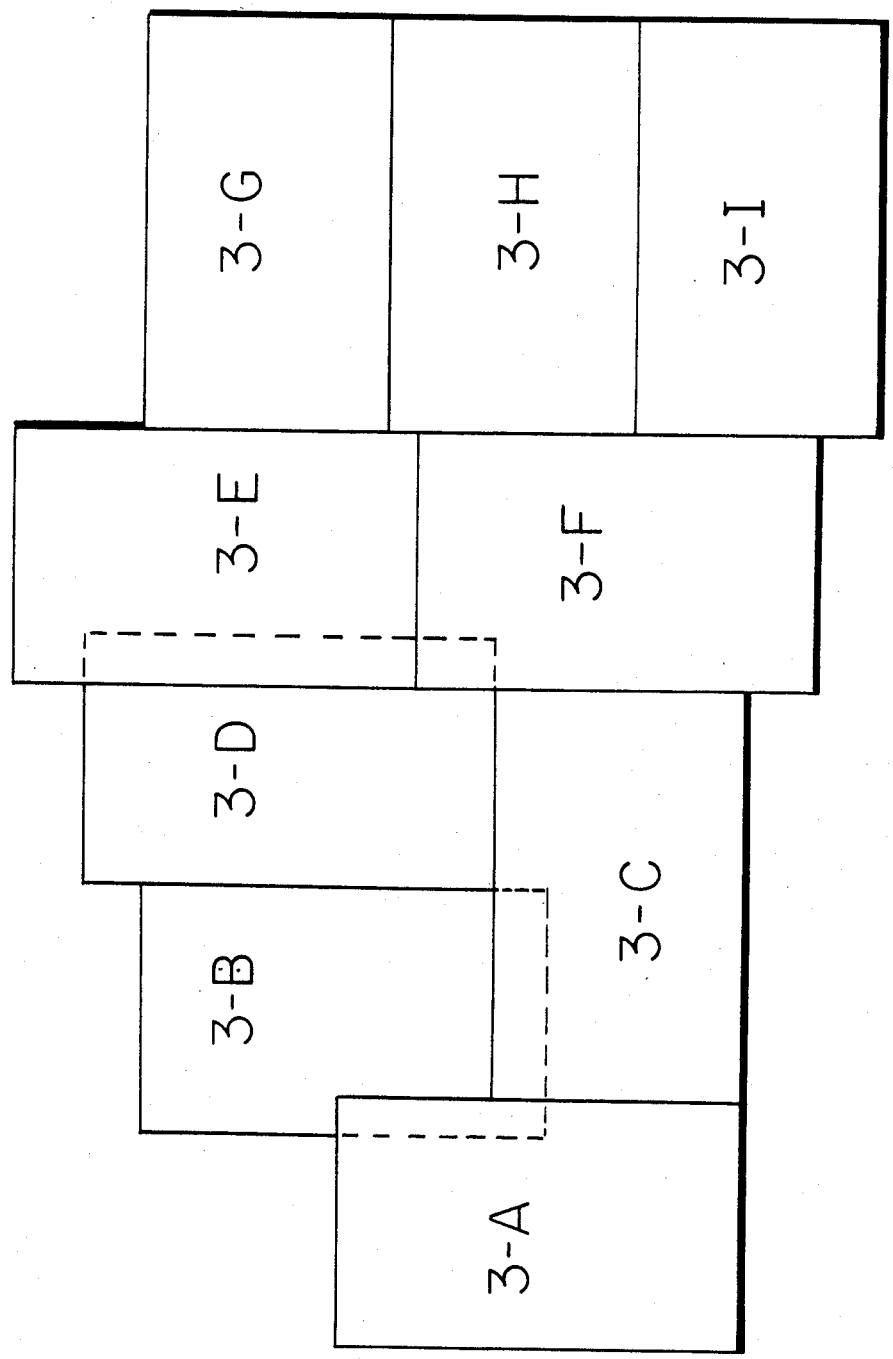
FIG. 3, being comprised of FIGS. 3A-3I, is a schematic diagram of the tester circuit of the present invention.
Figure 3A:
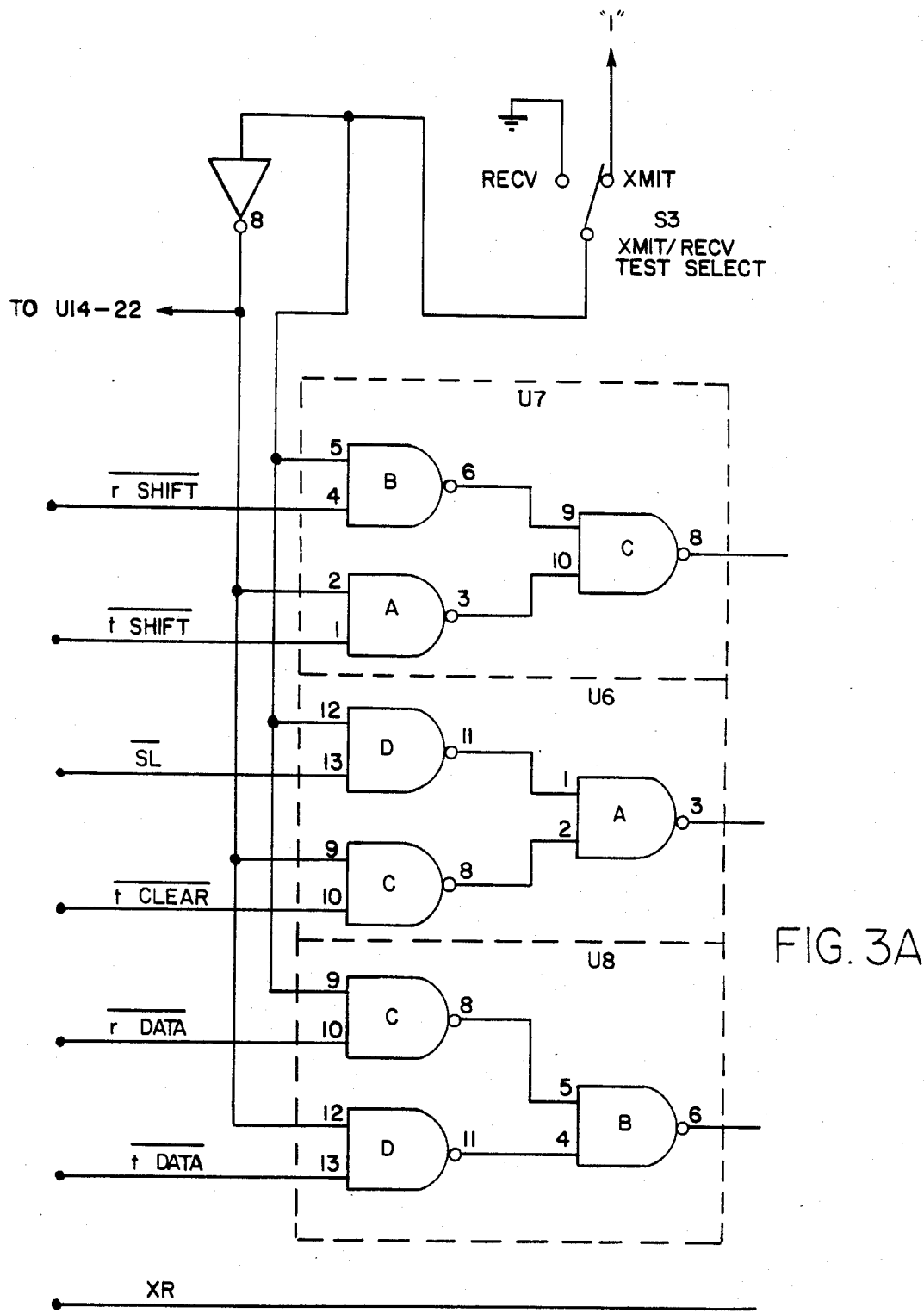
Figure 3B:
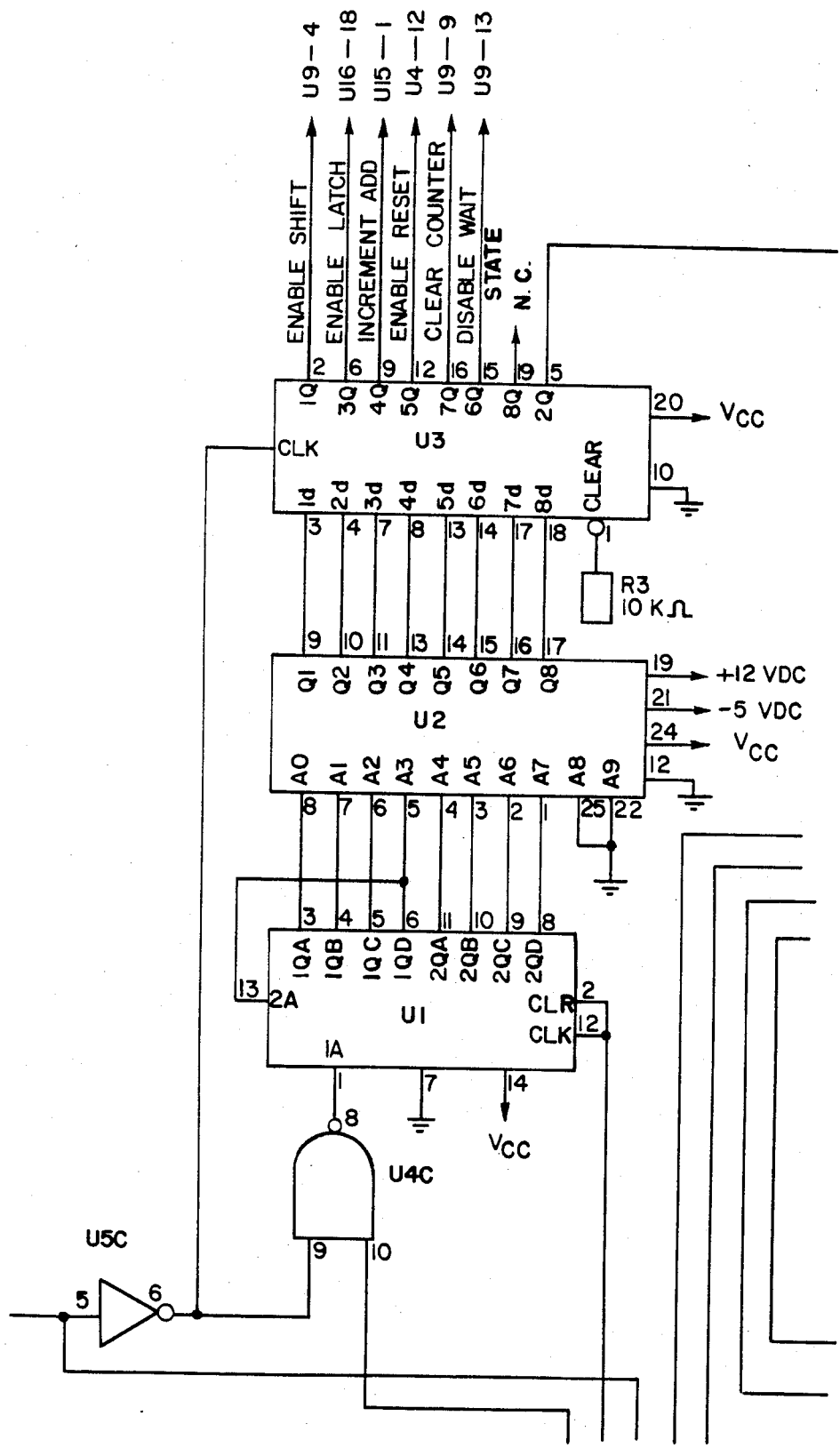
Figure 3C:
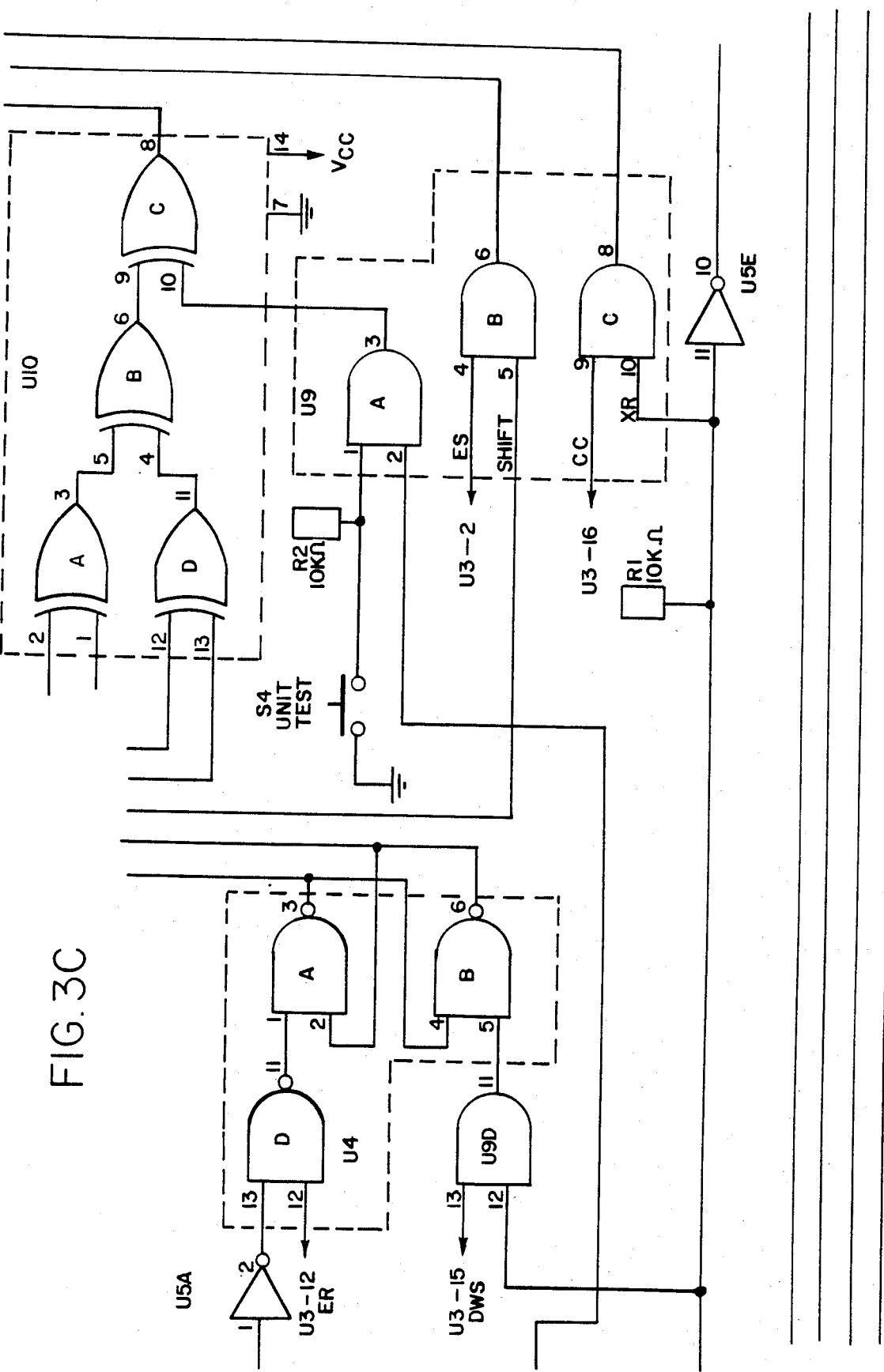
Figure 3D:
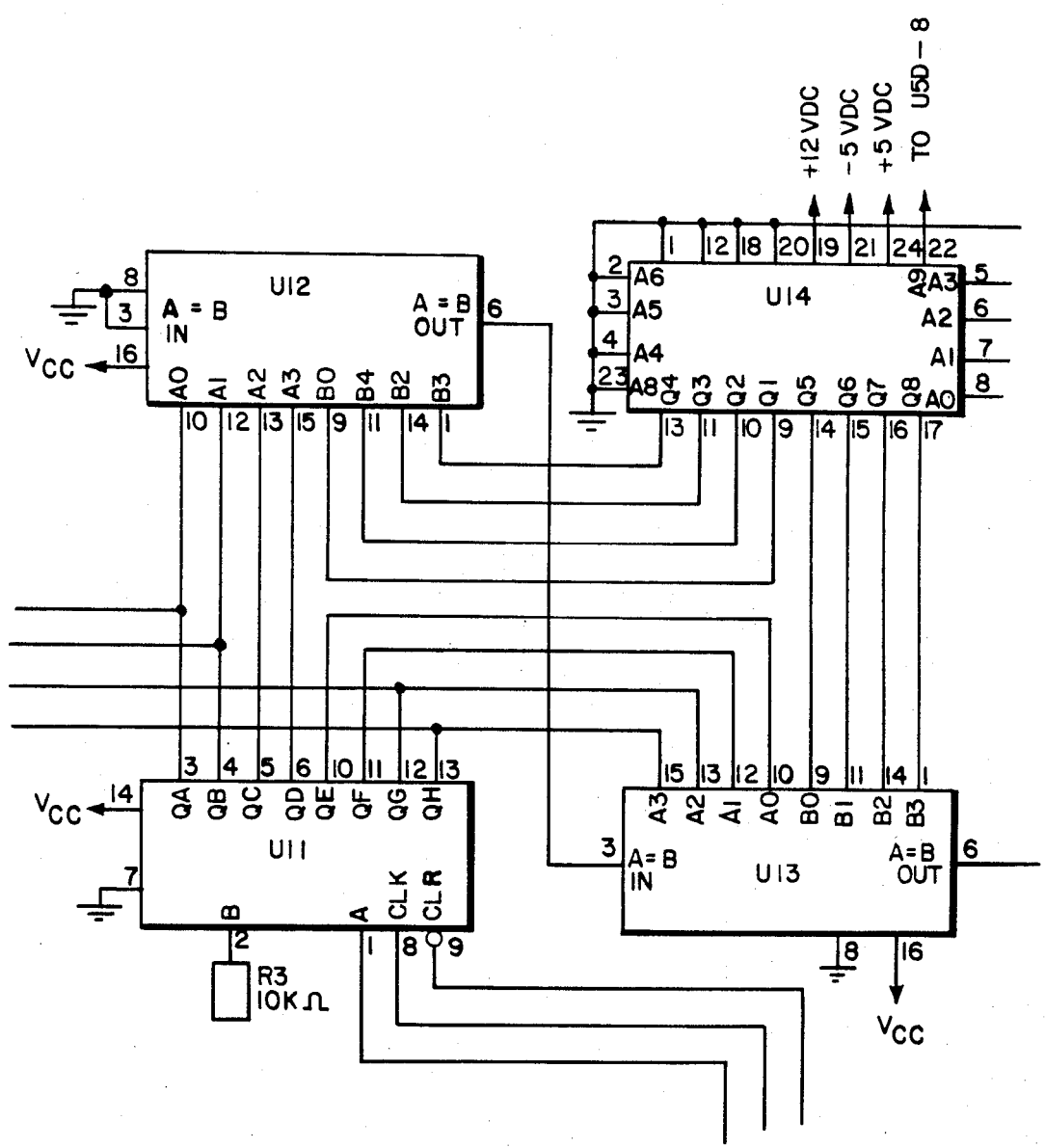
Figure 3E:
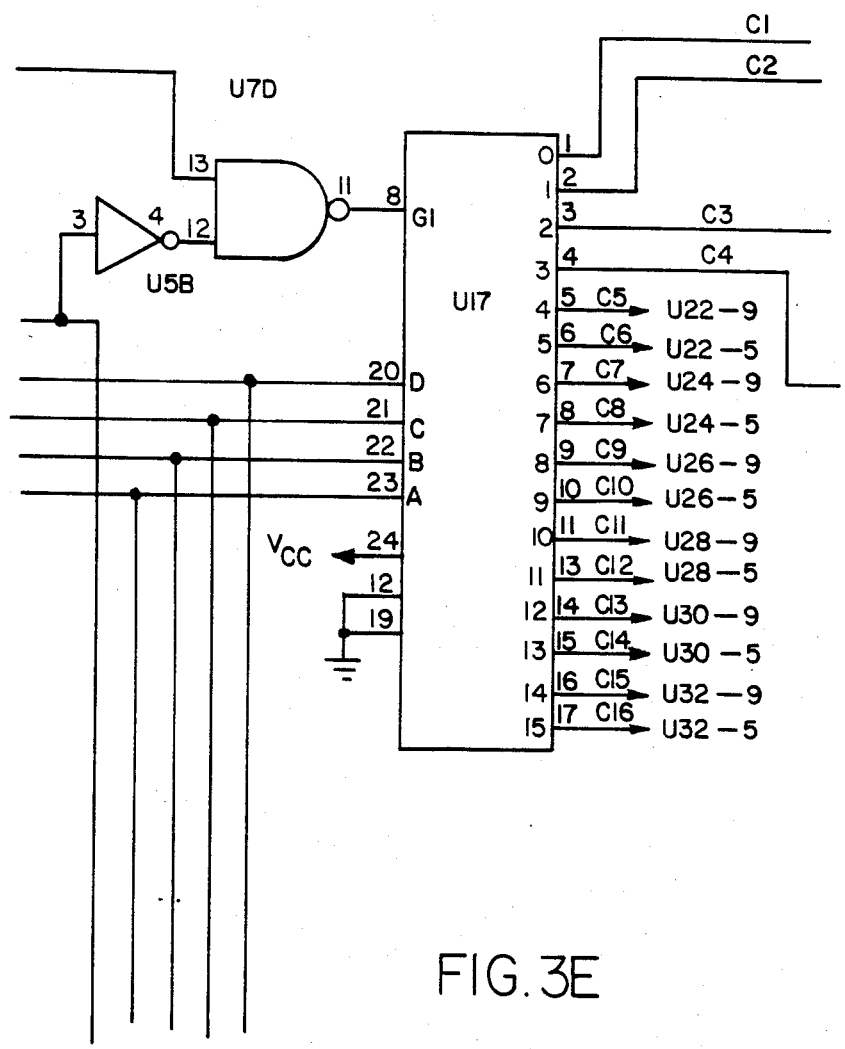
Figure 3F:
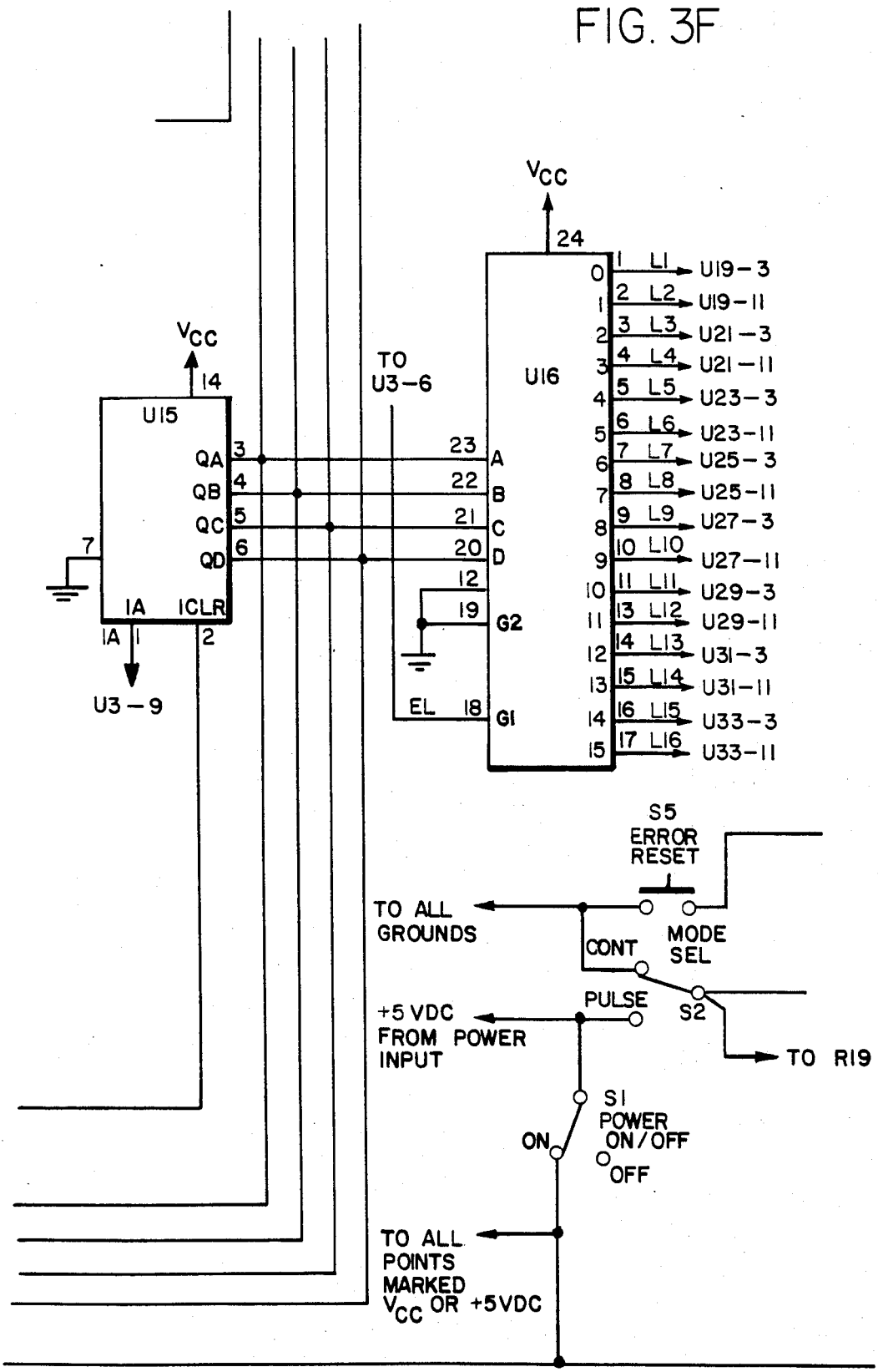
Figure 3G:
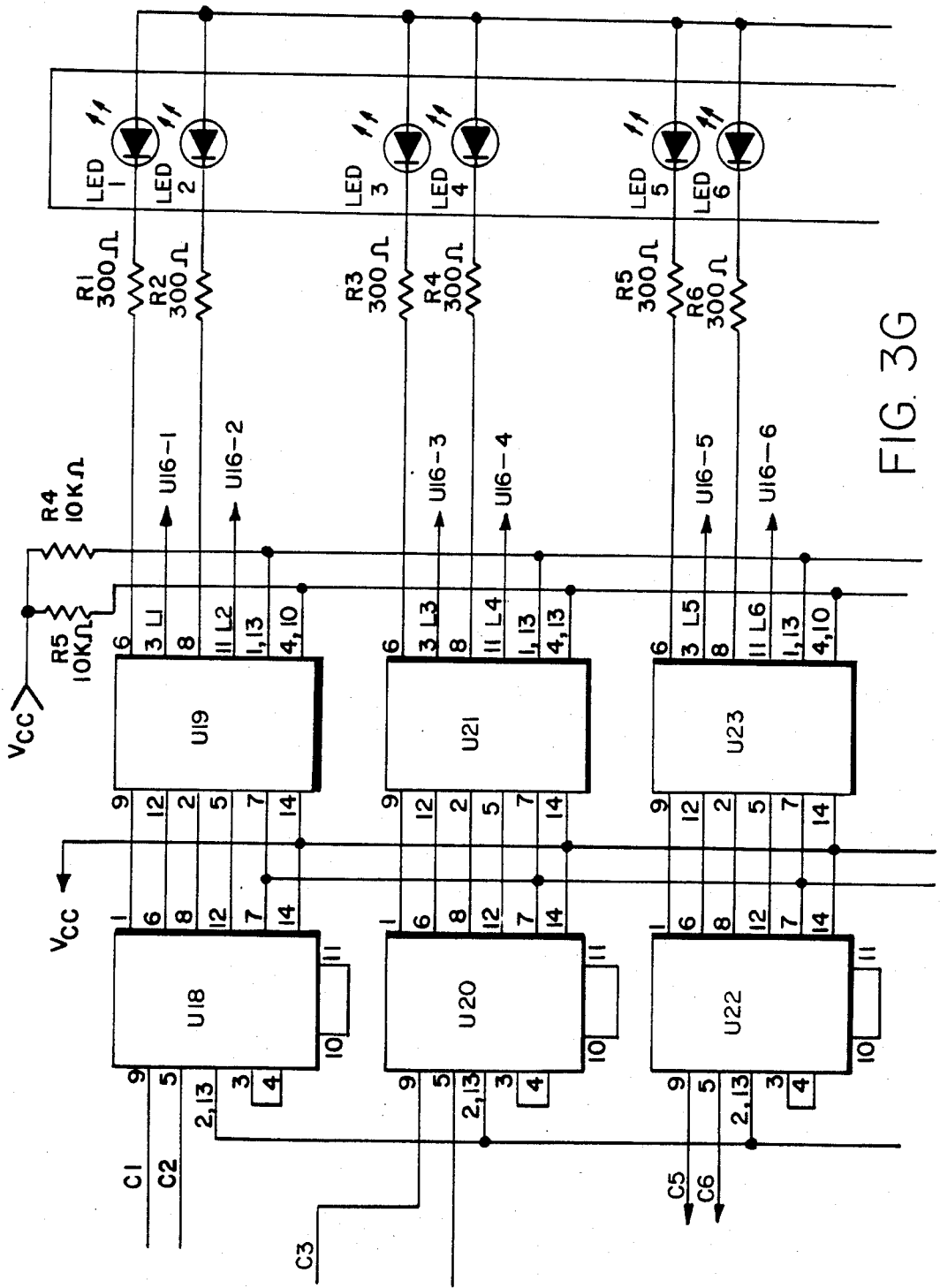
Figure 3H:
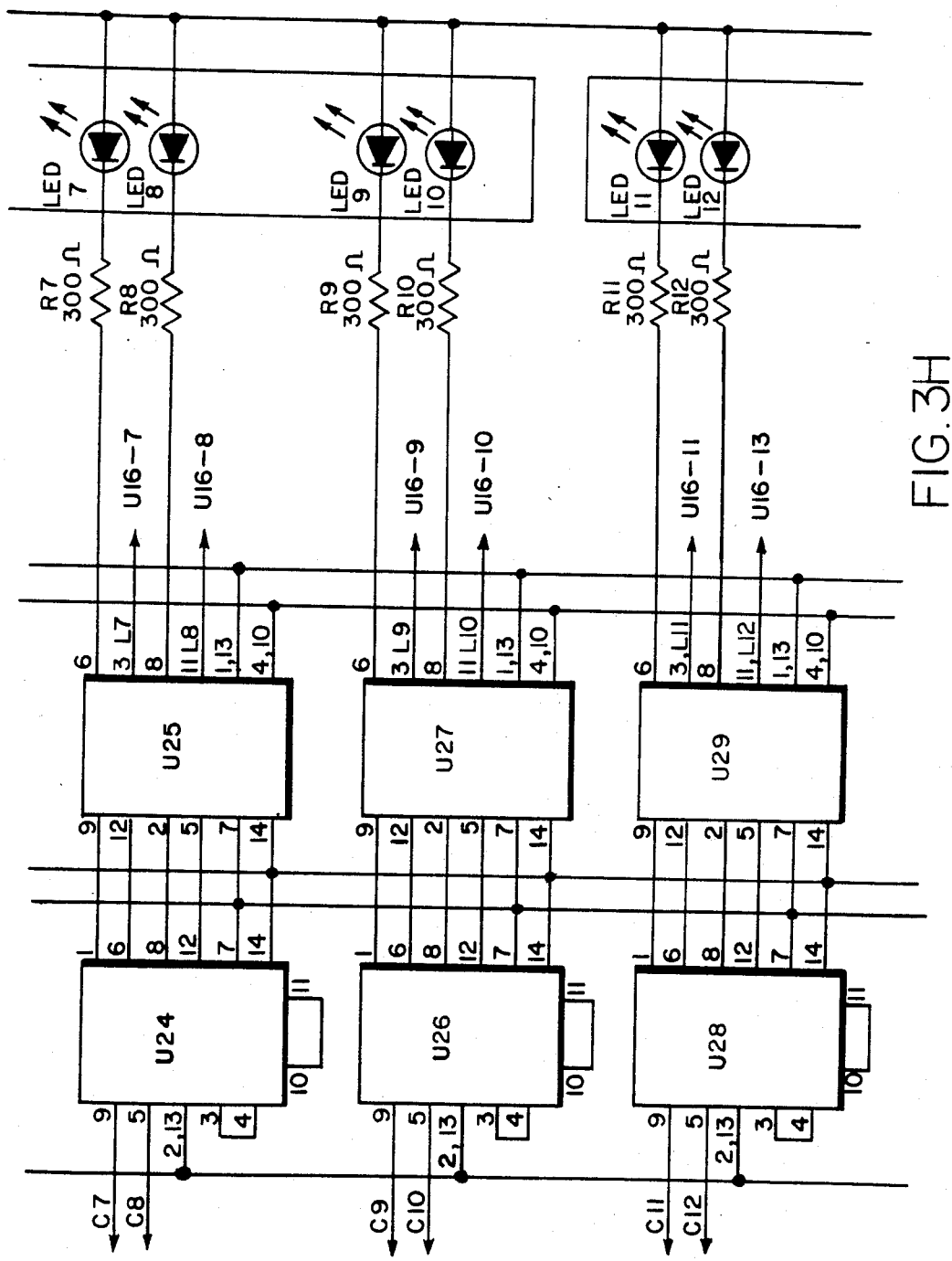
Figure 3I:
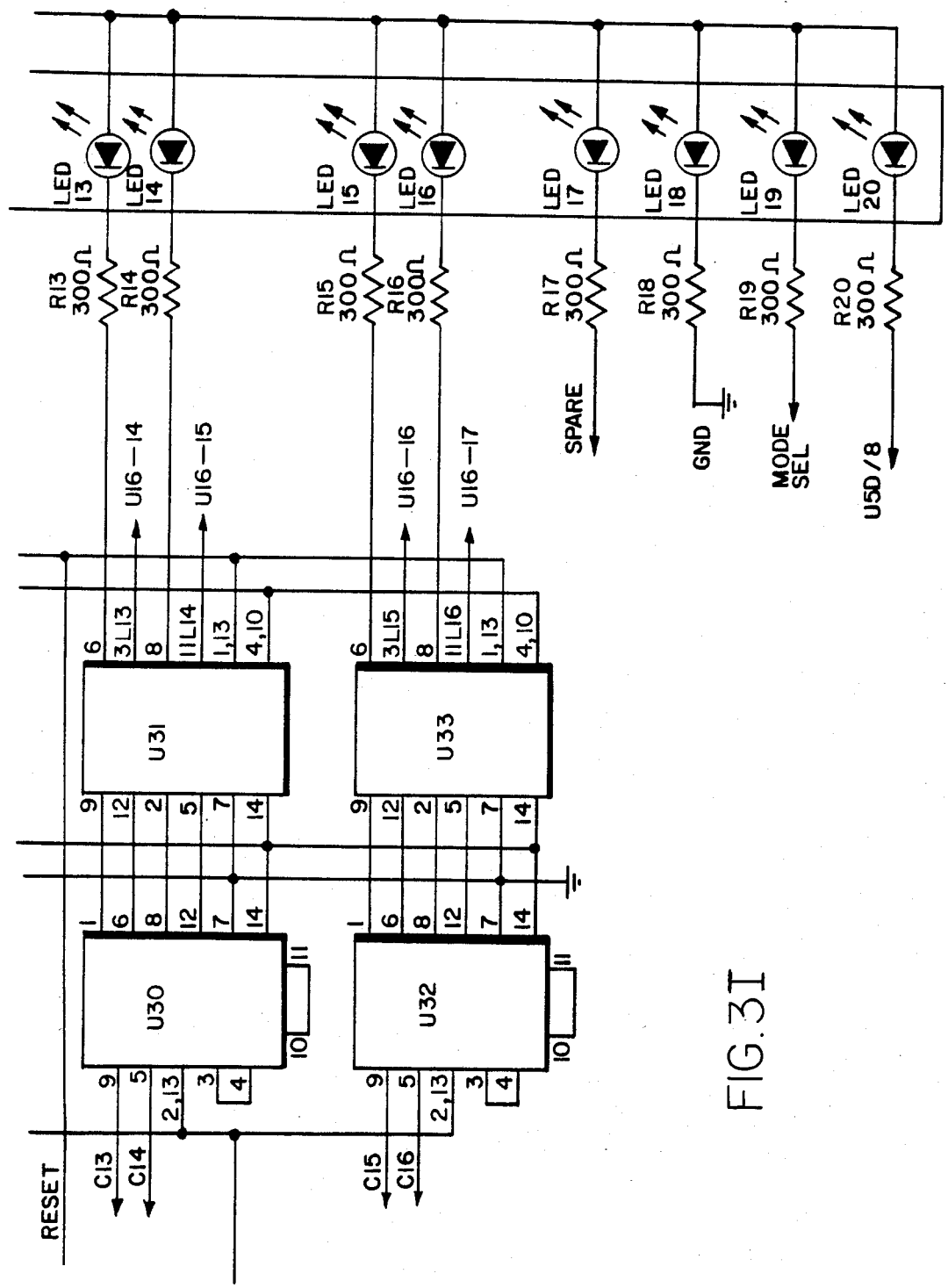
Figure 5:
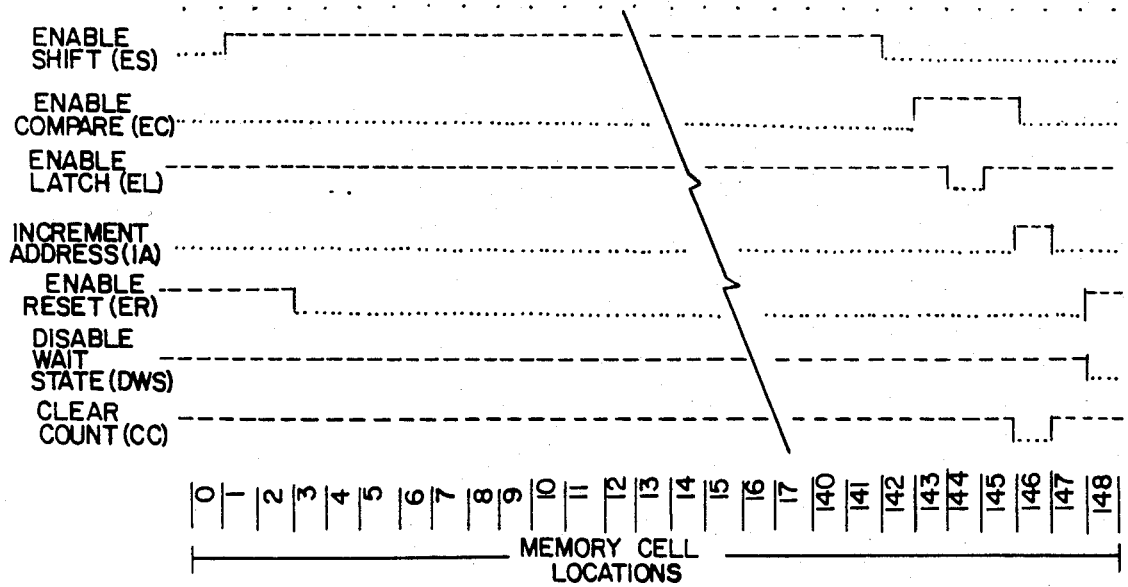
FIG. 5 illustrates timing waveforms utilized in the present invention.

Referring now to FIG. 3, and particularly to FIGS. 3A-3I, it will be seen that the tester unit contains two EPROMs U2 and U14. EPROM U14 holds the pre-stored correct signatures as discussed earlier. EPROM U2 holds the timing and control waveforms for unit operation which are produced by successively unloading EPROM U2 locations in synchronization with either transmit or receive timing signals from the transceiver unit. Seven of the eight possible bit cells (as the EPROM is viewed vertically) are pre-loaded with combinations of ones and zeros to produce the "waveforms" as the EPROM U2 is sequenced through its addresses (horizontally). Integrated circuit U3 latches each signal to insure that state changes occur simultaneously. A complete set of timing and control waveforms for a particular optical transceiver under test appear in FIG. 5 of the drawings. The tester will examine either the transceiver's transmit or receive timing waveforms. Selection of which group is active is determined by the position of the XMIT/RECV TEST SELECT switch S3 which is physically located on the front panel of the tester and is shown on the upper left of FIG. 3A. Depending upon which logic state is present, either the receive signals (gates U7B, U6D, and U8C) or the transmit signals (gates U7A, U6C, or U8D) are passed through the selector logic.

One of the selected shift clocks, $\overline{r \text{ shift}}$ or $\overline{t \text{ shift}}$, will become the controlling clock for the tester logic and one of the selected reference points, $\overline{SL}$ or $\overline{t \text{ clear}}$, will be used to mark the start of each transceiver timing cycle. These four signals arrive in an inverted form due to the fact that they are buffered in the particular transceiver under test.

The remaining selected signal will be either $\overline{r \text{ data}}$ or $\overline{t \text{ data}}$. These two signals are the output of a 16 to 1 multiplexer chip in the particular transceiver under test. The signal present at any particular time will be one of the sixteen selected timing signals for either the receiver portion or the transmit portion of the transceiver logic. Which of the sixteen signals is selected at the multiplexer is determined by the logic states present on the address lines, ADD1–ADD4, shown exiting the tester on the lower left of FIG. 3A of the drawings.

Gates U7C, U6A and U8B function as low input NOR gates to pass the selected signals on to the internal logic. Inverters U5C and U5A, correct the polarity of the signal. The output of inverter U5A, lock, is presented to NAND gate U4D. Just beyond this gate is a latch flip-flop formed by NAND gates U4A and U4B. The initial power-on state of this flip-flop determines what occurs first. Either the pin 3 or the pin 6 output of the flip-flop will be a logic one state. Since this is a flip-flop configuration, these two pins will always be reverse states of each other. The case where pin 6 has a high output state will be considered first.

When pin 6 output of the flip-flop formed by NAND gates U4A and U4B is high, clear (CLR) inputs to U1 on pins 2 and 12 will be in an active state, resulting in the chip being cleared. U1 is a dual four-stage binary up counter integrated circuit. With the pin 6 output (QD) fed back to the 2A input, (pin 13), it functions as an eight bit counter with a maximum count capacity of 256 (states 0–255).

Since the pin 3 output of NAND gate U4A (the latch flip-flop) is now low, NAND gate U4C is disabled, preventing the SHIFT signal from being applied to the 1A clock input of the counter chip U1 on its pin 1. This results in the situation where the counter is not only cleared to all zeros, but also becomes inactive, presenting an all zero output on output positions 1QA–1QD and 2QA–2QD.

The eight outputs from the counter U1 are applied to the address inputs of the EPROM U2. At the zero address, the contents of the EPROM are as follows: Q1-Enable Shift (ES)—low, Q2-Enable Compare (EC)—low, Q3-Enable Latch (EL)—high, Q4-Increment Address (IA)—low, Q5-Enable Reset (ER)—high, Q6-Disable Wait State (DWS)—high, Q7-Clear Counter (CC)—high. The Q8 output is not used.

At this time, the only output important to the following discussion is that on Q5. This output, which is high, will be latched into the de-glitching register (U3) to become the signal "ENABLE RESET" ("ER").

The next action to occur, happens at gate U4D. With the "ER" signal now high, the next synchronizing (LOCK) signal which occurs, as determined by the transceiver timing, will result in both inputs to NAND gate U4D being high. This will cause its pin 11 output to go to a low state. With the input to pin 1 of U4A now low, the output on its pin 3 goes to a high state, causing the latch flip-flop formed by U4A and U4B to change state. This action removes the clear condition from the counter (U1) and enables the clock input at gate U4C, permitting the counter to run for a full cycle. At the end of the cycle, the DISABLE WAIT STATE (DWS) signal becomes high. This signal, present in the high state at the pin 13 input to gate U9C, will cause the pin 8 output of the same gate to go high, reversing the state of the latch flip-flop. With the latch flip-flop reset again, the entire logic locks up until the next LOCK signal arrives.

Should the latch flip-flop (U4A-U4B) power up in the opposite state, the counter would be activated at once. This will result in cycling the EPROM U1 through a partial cycle producing the DWS signal which puts the tester back to a preset state to await the first LOCK signal.

During the cycle of the timing source EPROM U2, the four address lines (ADD 1–ADD 4) going to the transceiver and to two internal areas of the tester remain in the same state, i.e., unchanging. The counter U15 which produces these addressing signals changes only when the INCREMENT ADDRESS (IA) signal is produced. This occurs at the end of each cycle. The four address lines, as explained earlier, are used by the 16 to 1 multiplexing chip in the transceiver to select one of sixteen transmit timing waveforms and one of sixteen receive timing waveforms to forward to the tester unit. Since the address is stable for the tester EPROM timing cycle, the same signals are presented from the transceiver on the "$\overline{r \text{ data}}$" and "$\overline{t \text{ data}}$" lines for the entire examination time. Only one of these signals will be forwarded as the "data" signal to the pin 2 input of gate U9A. With the pin 1 input held high by the pull-up resistor, R2, the "data" signal is passed through to the pin 10 input of the exclusive OR gate U10C.

Integrated circuit U11, is an eight bit, serial to parallel shift register. Its outputs are presented to a pair of four bit comparators U12 and U13. Some of the outputs are also presented to the inputs of the exclusive OR gates U10A and U10D. With the initial contents of register U11 cleared to all zeros, caused by the CLEAR CONTROL (CC) signal going to a low state on pin 9 on gate U9C, these feedback signals to the exclusive OR gates are all zeros. Since an exclusive OR gate, by definition, must have only one of its inputs high to be high, it follows that the input to pin 9 exclusive OR gate U10C is initially low.

The clock input (pin 8) to the shift register U11 is derived from gate U9B. Gate U9B is held active allowing the shift signal through, by the signal ENABLE SHIFT ES. The ES signal is held high by the EPROM U3 output except for the period when the actual comparison is taking place. During that period, the shift register U11 is held stable. With the occurrence of each shift clock on the pin 8 input of the serial to parallel register U11, the state present at pin 1 (A) is shifted into the QA stage.

Assuming, after the first clock input, that a one has been shifted in, a one level is now present at the pin 3 (QA) output. With all other outputs still low, this causes the output of exclusive-OR gate U10D to go high, which in turn, causes U10B to go high becoming a high input to U10C. If, at the next clock period the pin 10 input to U10C is high, the one level now present on pin 9 of the exclusive OR gate would result in a low output on pin 8. Thus, the exclusive OR circuitry, with feedback taps from the shift register, randomizes the data input. At the end of a tester unit timing cycle, the signal ES goes to a low state, inhibiting the shifting of the shift register, thereby locking it up with the resulting randomized shift register contents held constant during the comparison period.

During this examination and randomizing cycle, the same address sent to the transceiver has also been presented to the pattern EPROM U14 and to two one-of-sixteen selectors U16 and U17. This uniquely selects the correct location in the pattern EPROM U14 to retrieve the correct pattern and the correct error-latch register to access if the comparison is incorrect.

The correct pattern, as retrieved from the pattern EPROM U14, is matched to the randomized content of the shift register U11 at comparator gates U12 and U13. If all eight bits compare correctly, the A=B output of each half of the comparators will be true. The inverter U5B on the output of pin 6 on U13 reverses this condition so that the input to pin 12 of integrated circuit NAND gate U7D is high when they do not compare. The pin 11 output of gate U7D, therefore, goes to a low state only when the two do not compare correctly.

When comparisons are correct, one output of the U17 distributor and one output of the U16 distributor will be high. It will be noted again, that these selections are made by the same address which selected the pattern for comparison and the timing signal for examination.

One of the selected compare outputs (C1-C16) and the corresponding latch signal (L1-L16) are presented to uniquely assigned NAND gate/flip-flop combinations (integrated circuits U18/19, 20/21, etc.). These logic combinations are shown as boxes with their inputs and outputs shown, and one such combination (U32-/U33) is shown in greater detail in FIG. 4 of the drawings. The inputs are discussed below but it should be first noted that the flip-flop outputs are connected through a resistor (R1-R16) to a corresponding light emiting diode (LED1-LED16). Since the anode side of each LED is tied to a positive voltage, the LEDs are illuminated when the input to the resistor is a logic zero level. These inputs are connected to the zero side output of the flip-flop. Therefore, the LED is illuminated when the flip-flop is set. Each flip-flop is set when the corresponding miscompare occurs.

On the input side of the flip-flop logic there are two switch controlled signals. One is the reset input which clears the captured error conditions. The second is a signal called selected (SEL). Examination of the source of this signal will show that this signal will become a one level when the MODE SELECT switch is placed in the PULSE mode. In the CONTINUOUS mode, this signal is held to a logic zero.

Figure 4:
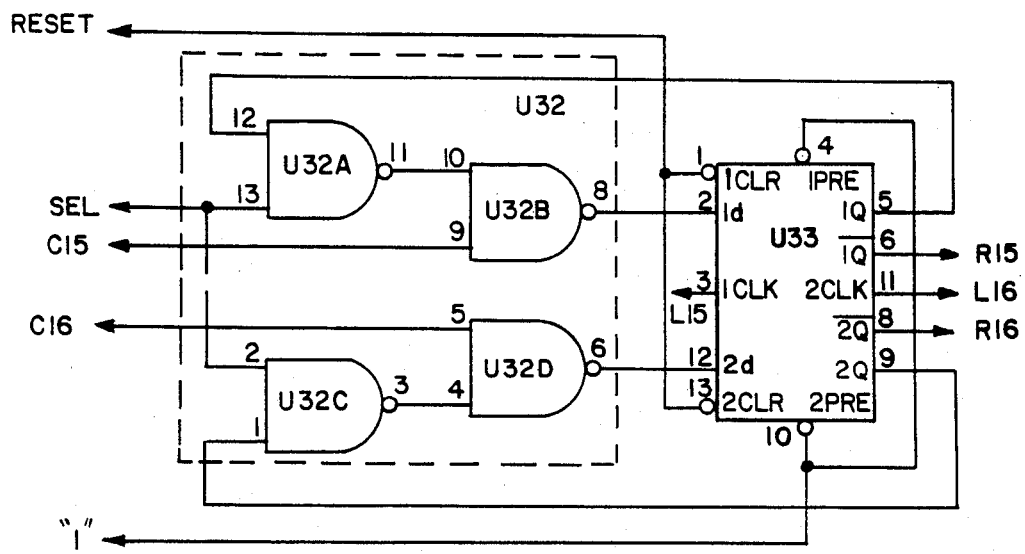
FIG. 4 is a more detailed schematic of certain integrated circuits shown in FIGS. 3G-3I of the drawings.

The influence of the SEL signal on error display operation can be seen in the detailed logic of the gate/-flip-flop combination, U32/U33, which is shown in FIG. 4 of the drawings.

FIG. 4 shows the logic/flip-flop combination U32-/U33 used to trap an error condition. Two independent error circuits are represented although this is not apparent at first because both flip-flops are shown in the same physical package. These flip-flops are D edge-triggered type. With a one level present at the d input (pin 2 or pin 12), the flip-flop will set with the transition of the input clock from a zero level to a one level. If the d input is a zero, the flip-flop will remain reset or if set, will be reset. The output of the NAND gate (U32B or U32D) feeding the d input becomes a high level when either the associated compare (C) input is low or the output of the NAND gate is low. This is where the SEL signal comes into play. With the select signal low, the output of the gate it feeds will always stay at a one level and the d input will be influenced only by the compare (C) input. However, when the select signal is high, the error is latched. The initial compare error will cause the flip-flop to be set. After this time, the one side output is fed back to hold the second input to the NAND gate, forcing and holding the output low. After this occurs, the error condition is latched until the reset button is depressed. This permits transient error conditions to be captured. When the mode select switch is in the continuous position, the flip-flop state will follow the error state.

The only function not discussed thus far is the UNIT TEST switch S4. When this switch is acitvated, it inhibits the input data signal from reaching the shift register. Except for the positions where the correct comparison pattern is always zero, this will cause the remaining dual LEDs to be set. This not only insures that the tester is functioning properly, but also tests for the presence of the four clock signals provided to the tester from the transceiver and the presence of all used DC power sources in the tester.

The preferred embodiment of the invention described in FIG. 3 has been constructed using the following type integrated circuit devices:

| IC | TYPE |
| --- | --- |
| U1, U4, U6-U8, U18, U20, U22, U24, U26, U28, U30, U32 | 54L500 <br> " <br> " |
| U2, U14 | 27L08 |
| U3 | 54L5273 |
| U5 | 54L504 |
| U9 | 54L508 |
| U10 | 54L586 |
| U11 | 54L5164 |
| U12, U13 | 54L585 |
| U15* | 54L5393 |
| U16, U17 | 54L5154 |
| U19, U21, U22, U23, U25, U27, U29, U31, U33 | 54L574 <br> " |

Although the invention has been described with reference to a particular embodiment, it will be understood to those skilled in the art that the invention is capable of a variety of alternative embodiments within the spirit and scope of the appended claims.

What is claimed is:

1. Test apparatus for monitoring the on-line operation of a transceiver and for providing visual indications of either recurrent or non-recurrent fault conditions therein comprising:
   timing and control logic circuitry adapted to receive digital synchronization signals associated with either the transmit section or receive section of said transceiver and to generate therefrom timing and control signals utilized in said test apparatus;

a signature pattern computation generator including a serial to parallel bit shift register having a serial bit input terminal and a plurality of parallel bit output terminals, feedback gating structure coupling select ones of said plurality of parallel bit output terminals to said serial bit input terminal, and a transceiver waveform input terminal coupled to said feedback gating structure;

address selection means and transmit section/receive section selection means, said address selection means enabling the transfer of an addressed transmit section waveform and a similarly addressed receive section waveform of said transceiver to said transmit section/receiver section selection means, said transmit section/receive section selection means enabling the transfer of a selected transceiver waveform to said transceiver waveform input terminal of said signature computation generator;

signature validation pattern storage means enabled by said address selection means and said timing and control logic circuitry for providing the predetermined correct signature validation pattern for said selected transceiver waveform;

a comparator circuit for comparing the computed signature pattern for said selected transceiver waveform formed by said signature pattern computation generator at its parallel bit output terminals to said correct signature validation pattern stored in said signature validation pattern storage means and providing an error signal upon detection of any mismatch thereof;

a plurality of visual display devices each indicating a transceiver waveform fault condition; and error signal distributor means enabled by said address selection means for coupling said error signal related to each said selected transceiver waveform from said comparator circuit to the associated one of said plurality of visual display devices, said error signal distributor means having latching means for selectively sustaining the activation of said visual display devices after the termination of a detected non-recurrent fault condition in said transceiver.

2. Test apparatus as defined in claim 1 wherein said signature validation pattern storage means is an erasable programmable read only memory.

3. Test apparatus as defined in claim 2 wherein said plurality of visual display devices are light emitting diodes.

4. Test apparatus as defined in claim 3 wherein said selected transceiver waveform applied to said transceiver waveform input terminal of said signature pattern computation generator is a repetitive multibit waveform having more than ten times the number of bits than formed at said plurality of parallel output terminals of said signature computation generator.

5. Test apparatus as defined in claim 4 wherein said feedback gating structure includes a pyramidal arrangement of exclusive-OR gates having the base thereof coupled to the first two and the last two of said plurality of parallel bit output terminals of said shift register of said signature pattern computation generator.

6. Test apparatus as defined in claim 5 wherein said feedback gating structure further includes an additional exclusive-OR gate having one input coupled to the apex of said pyramidal arrangement of exclusive-OR gates, a second input coupled to said transceiver waveform input terminal and an output coupled to said serial bit input terminal of said shift register of said signature pattern computation generator.

7. Test apparatus as defined in claim 6 wherein said latching means includes a plurality of gated flip-flop circuits adapted to be switched to an error latch state upon concurrent receipt of an error signal and a pulse mode select signal, and adapted to be switched to a reset state upon receipt of a reset signal.

8. Test apparatus as defined in claim 7 wherein said timing and control logic circuitry includes a gated serial to parallel shift register receiving said synchronization signals, and an erasable programmable read only memory having its address terminals coupled to the parallel shift register and forming said timing and control signals at its output terminals.

* * * * *